US008169668B2

(12) United States Patent
Nemoto

(10) Patent No.: US 8,169,668 B2
(45) Date of Patent: May 1, 2012

(54) IMAGE PROCESSING APPARATUS AND FILE TRANSMISSION METHOD

(75) Inventor: Junko Nemoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1314 days.

(21) Appl. No.: 11/462,751

(22) Filed: Aug. 7, 2006

(65) Prior Publication Data
US 2007/0043864 A1 Feb. 22, 2007

(30) Foreign Application Priority Data
Aug. 17, 2005 (JP) ................................. 2005-236735

(51) Int. Cl.
*H04N 1/00* (2006.01)
(52) U.S. Cl. ......... 358/405; 358/1.9; 358/400; 358/402; 358/403; 358/474
(58) Field of Classification Search .................. None
See application file for complete search history.

(56) References Cited

U.S. PATENT DOCUMENTS

| | | | | |
|---|---|---|---|---|
| 5,351,136 A * | 9/1994 | Wu et al. ........................ | 358/440 |
| 5,461,488 A * | 10/1995 | Witek ........................... | 358/402 |
| 5,760,917 A | 6/1998 | Sheridan | |
| 5,917,615 A * | 6/1999 | Reifman et al. .............. | 358/468 |
| 6,188,766 B1 * | 2/2001 | Kocher ......................... | 380/246 |
| 6,237,099 B1 | 5/2001 | Kurokawa | |
| 6,459,499 B1 * | 10/2002 | Tomat .......................... | 358/1.15 |
| 6,839,741 B1 * | 1/2005 | Tsai .............................. | 709/217 |
| 7,139,102 B2 * | 11/2006 | Minato ........................ | 358/3.07 |
| 7,412,602 B2 * | 8/2008 | Park et al. .................... | 713/182 |
| 7,526,812 B2 * | 4/2009 | DeYoung ...................... | 726/26 |
| 7,570,398 B2 * | 8/2009 | Tian ............................. | 358/474 |
| 7,571,486 B2 * | 8/2009 | Lam .............................. | 726/26 |
| 7,573,615 B2 * | 8/2009 | Kasatani ...................... | 358/402 |
| 7,613,678 B2 * | 11/2009 | Koguchi ........................ | 707/1 |
| 7,634,455 B1 * | 12/2009 | Keene et al. .................. | 1/1 |
| 7,913,053 B1 * | 3/2011 | Newland ...................... | 711/172 |

(Continued)

FOREIGN PATENT DOCUMENTS

JP 09-185541 A 7/1997

(Continued)

OTHER PUBLICATIONS

"Technical Overview of Windows Rights Management Services for Windows Server 2003", Microsoft Windows Rights Management Services, Microsoft Corporation, Nov. 2003 (Updated Apr. 2005), XP007910684, Internet citation, Apr. 1, 2005. Retrieved from the internet: URL: http://download.microsoft.com/download/8/d/9/8d9dbf4a-3b0d-4ea1-905b-92c57086910b/RMSTechOverview.doc>.

(Continued)

*Primary Examiner* — King Poon
*Assistant Examiner* — Dung Tran
(74) *Attorney, Agent, or Firm* — Cowan, Liebowitz & Latman, P.C.

(57) ABSTRACT

An image processing apparatus is premised on the assumption that it is connected to a policy server. If no access policy is given to a file to be transmitted, the image processing apparatus forms definition information for defining an access policy, and registers the formed definition information in the policy server. The image processing apparatus then transmits, to a client computer across a network, a file to which the access policy is given.

4 Claims, 21 Drawing Sheets

U.S. PATENT DOCUMENTS

| | | | |
|---|---|---|---|
| 2002/0015178 A1* | 2/2002 | Tamaru | 358/1.15 |
| 2005/0097337 A1* | 5/2005 | Sesek et al. | 713/186 |
| 2005/0144469 A1* | 6/2005 | Saitoh | 713/189 |
| 2005/0231746 A1* | 10/2005 | Parry et al. | 358/1.13 |
| 2006/0045124 A1* | 3/2006 | Dahlstrom et al. | 370/465 |
| 2006/0101523 A1* | 5/2006 | Talbert | 726/26 |
| 2007/0094740 A1* | 4/2007 | Shudo | 726/26 |
| 2008/0027949 A1* | 1/2008 | Kawada | 707/10 |

FOREIGN PATENT DOCUMENTS

| | | |
|---|---|---|
| JP | 2002-007287 A | 1/2002 |
| JP | 2003-186831 A | 7/2003 |
| JP | 2003-281148 | 10/2003 |
| JP | 2003-304532 | 10/2003 |
| JP | 2005-064757 A | 3/2005 |
| JP | 2005-202888 A | 7/2005 |

OTHER PUBLICATIONS

The above cited references were cited in a Dec. 8, 2009 European Search Report of the counterpart European Patent Application No. 06118831.4.

The above references (1-4) were cited in a May 17, 2010 Japanese Office Action, which is enclosed without English Translation, that issued in Japanese Patent Application No. 2005-236735.

The above reference was cited in a Nov. 25, 2011 Japanese Office Action, which is enclosed without an English Translation, that issued in Japanese Patent Application No. 2010-250247.

* cited by examiner

F I G. 6

| USER ID | USER NAME | DESTINATION |
|---|---|---|
| 0001 | Sato Taro | Sato.Taro@abc.com |
| 0002 | Suzuki Hanako | Suzuki.Hanako@abc.com |
| | | |

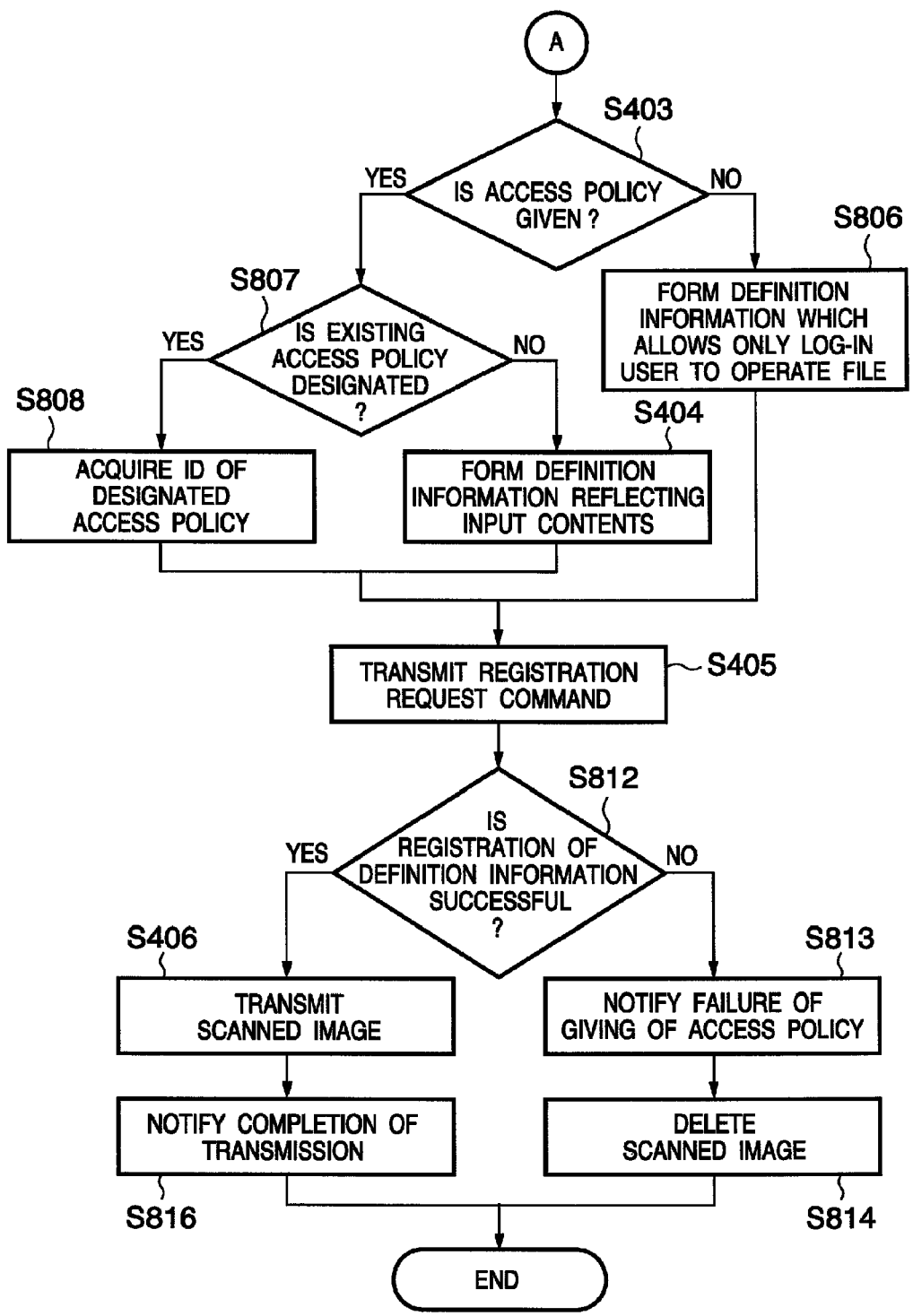

FIG. 12

| USER ID | OPERATIONS | | | VALID PERIOD | |
|---|---|---|---|---|---|
| | DISPLAY | EDIT | PRINT | START | END |
| 0001 | ○ | × | × | 2004/04/01 | 2005/03/31 |
| 0002 | ○ | ○ | ○ | 2004/04/01 | 2005/03/31 |
| 0003 | ○ | × | × | 2004/04/01 | 2004/06/30 |

F I G. 14

| COMMAND LENGTH | ACCESS USER ID |
|---|---|
| REQUEST ID | DOCUMENT ID |
| POLICY ID | ELEMENT COUNT |
| USER ID | DISPLAY PERMISSION |
| EDITING PERMISSION | PRINTING PERMISSION |
| START DATE | END DATE |
| USER ID | DISPLAY PERMISSION |
| EDITING PERMISSION | PRINTING PERMISSION |
| START DATE | END DATE |
| USER ID | DISPLAY PERMISSION |
| EDITING PERMISSION | PRINTING PERMISSION |
| START DATE | END DATE |

ELEMENT (1), ELEMENT (2), ELEMENT (n)

FIG. 15

| DOCUMENT ID | POLICY ID |
|---|---|
| xxxx | AAAA |
| yyyy | BBBB |
| yyyy_2 | CCCC |
| zzzz | AAAA |

FIG. 16

| POLICY ID | USER ID | OPERATIONS | | | VALID PERIOD | |
|---|---|---|---|---|---|---|
| | | DISPLAY | EDIT | PRINT | START | END |
| AAAA | 0001 | ○ | × | × | 2004/04/01 | 2005/03/31 |
| | 0002 | ○ | ○ | ○ | 2004/04/01 | 2005/03/31 |
| | 0003 | ○ | × | × | 2004/04/01 | 2004/06/30 |
| BBBB | 0001 | ○ | × | × | 2004/04/01 | 2005/03/31 |
| | 0002 | ○ | ○ | ○ | 2004/04/01 | 2005/03/31 |
| | 0003 | ○ | × | ○ | 2004/04/01 | 2005/03/31 |
| | 0004 | ○ | ○ | ○ | 2004/04/01 | 2004/01/31 |

FIG. 20

DOCUMENT ID : XXXX

CONTENTS OF FILE

IMAGE PROCESSING APPARATUS AND FILE TRANSMISSION METHOD

BACKGROUND OF THE INVENTION

1. Field of the Invention

The present invention relates to an image processing apparatus such as an image forming apparatus.

2. Description of the Related Art

Recently, a system which transmits image data read by a multi-function copier to a client computer by attaching the data to an e-mail is finding widespread use. Image data sometimes contains secret information such as personal information. Therefore, it is important to ensure the security of image data.

Japanese Patent Application Laid-Open No. 2003-304352 has proposed a method which associates security information (a password for collation, editing, and printing) with image data when transmitting the image data. This method allows only a person who knows the password to access the image data.

Japanese Patent Application Laid-Open No. 2003-281148 has proposed a method by which when a document image is to be read, a sheet on which access restriction information is handwritten is also scanned by a scanner apparatus. Then, the document image data and access restriction information are stored as they are associated with each other. This method allows only a person having the access right to access the image data.

A policy server which controls the access right to a document file is available on the market. When a certain user is going to operate a document file in this system, a client computer inquires of the policy server about the access policy (access right) of the user. The client computer executes only operations permitted for the user on the document file. Examples of the server are Live Cycle Policy Server of Adobe and Rights Management Services of Microsoft.

The operation panel of the scanner apparatus described in Japanese Patent Application Laid-Open No. 2003-304352 is smaller than those of general PCs, and this makes it difficult to add security information to image data. On the other hand, the scanner apparatus described in Japanese Patent Application Laid-Open No. 2003-281148 requires a cumbersome operation of writing the contents of access control information on a sheet and scanning the sheet.

SUMMARY OF THE INVENTION

An image processing apparatus according to the present invention is based on the assumption that it is connected to a policy server. The policy server is an apparatus which, when receiving an inquiry about the access policy of a file, transmits access policy definition information registered in association with the file. If no access policy is given to a file to be transmitted, the image processing apparatus forms definition information for defining an access policy, and registers the formed definition information in the policy server, in order to give the access policy to the file. After that, the image processing apparatus transmits, across a network, the file to which the access policy is given.

According to a first aspect of the present invention, there is provided an image processing apparatus connectable to a policy server which transmits access policy definition information registered in association with a file when receiving an inquiry about an access policy of the file, the image processing apparatus comprising:

a storage unit which stores files containing image data and/or document data;

a determining unit which determines whether an access policy has been given to one of the files which is to be transmitted;

a registering unit which forms definition information for defining an access policy and registering the formed definition information in the policy server connected to the image processing apparatus, in order to give the access policy to the file if no access policy is given to the file; and a transmitting unit which transmits, across a network, the file to which the access policy is given.

According to a second aspect of the present invention there is provided an image processing system comprising an image processing apparatus for processing an image, a policy server connected to the image processing apparatus, and a client apparatus which receives a file from the image processing apparatus, the image processing apparatus comprising a unit which stores files containing image data and/or document data, a unit which determines whether an access policy is given to one of the files which is selected as a file to be transmitted, a unit which forms definition information for defining an access policy, and registering the formed definition information in the policy server connected to the image processing apparatus, in order to give the access policy to the file if no access policy is given to the file, and a unit which transmits, across a network, the file to which the access policy is given;

the policy server comprising a unit which stores definition information for defining an access policy concerning the file, a unit which receives an inquiry about an access policy of the file from the client apparatus, and a unit which reads out access policy definition information registered in association to the file, and transmits the readout definition information to the client apparatus; and the client apparatus comprising a unit which receives a file from the image processing apparatus, a unit which transmits an inquiry about an access policy given to the file to the policy server, a unit which receives definition information of the access policy given to the file from the policy server, and an executing unit which executes an operation on the file within a range permitted by the definition information.

According to a third aspect of the present invention, there is provided a file transmission method for an image processing apparatus connected to a policy server which transmits access policy definition information registered in association with a file when receiving an inquiry about an access policy of the file, the method comprising the steps of:

storing files each containing image data and/or document data;

determining whether an access policy is given to one of the files which is selected as a file to be transmitted;

forming definition information for defining an access policy, and registering the formed definition information in the policy server connected to the image processing apparatus, in order to give the access policy to the file if no access policy is given to the file; and transmitting, across a network, the file to which the access policy is given.

According to further aspects of the invention, there is provided a storage medium storing a computer program to be executed in a computer connected to a policy server which, when receiving an inquiry about an access policy of a file, transmits access policy definition information registered in association to the file, wherein the computer program causes the computer to execute steps of:

storing files each containing image data and/or document data;

determining whether an access policy is given to one of the files which is selected as a file to be transmitted;

forming definition information for defining an access policy, and registering the formed definition information in the policy server connected to an image processing apparatus, in order to give the access policy to the file if no access policy is given to the file; and transmitting, across a network, the file to which the access policy is given.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing an example of an address book (user table) according to the embodiment;

FIGS. 8A and 8B are flowcharts exemplifying another file transmission process according to the embodiment;

FIG. 12 is a view showing an example of a table which stores default definition information according to the embodiment;

FIG. 14 is a view showing examples of commands according to the embodiment;

FIG. 15 is a view showing an example of an ID management table according to the embodiment;

FIG. 16 is a view showing an example of a definition information table according to the embodiment;

FIG. 20 is a view showing an example of a document file according to the embodiment.

DESCRIPTION OF THE EMBODIMENTS

Preferred embodiments of the present invention will now be described in detail, by way of example only, in accordance with the accompanying drawings.

[First Embodiment]

Figure 1:
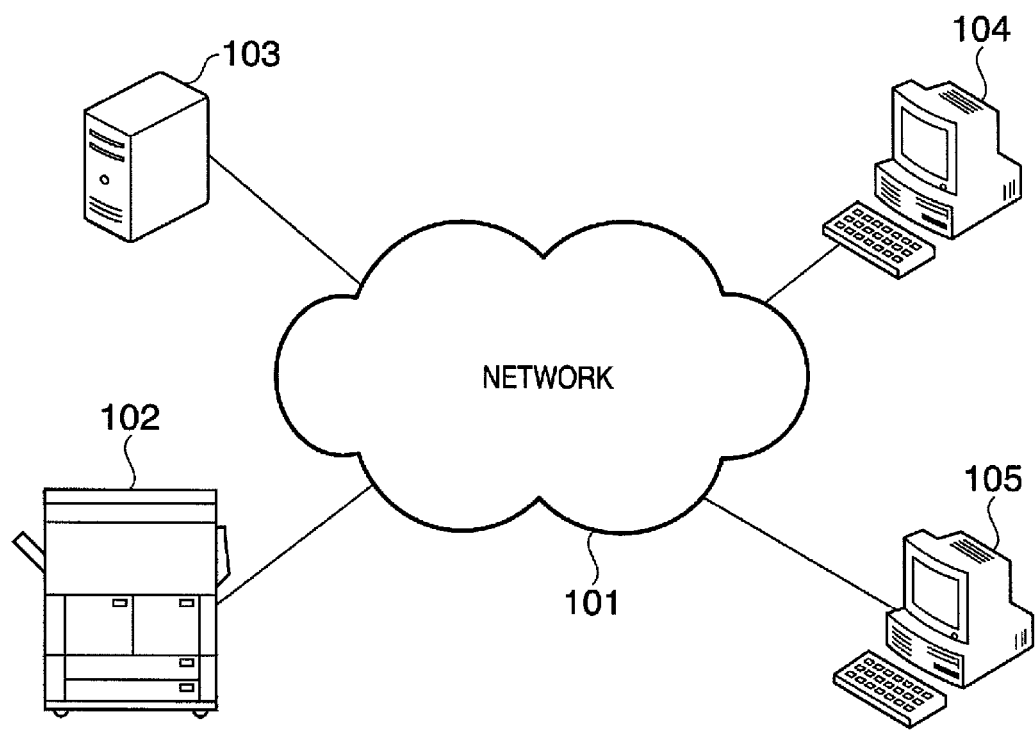
FIG. 1 is a view showing an example of an image processing/forming system according to an embodiment.

FIG. 1 is a view showing an example of an image processing/forming system according to an embodiment. A network 101 is a communication network which supports a TCP/IP protocol or the like. The network 101 can be either a wired network or wireless network. A multi-function copier 102 is an example of an image processing apparatus. This image processing apparatus may also be a scanner apparatus or a system combining a scanner apparatus and a PC. Note that these are merely examples of an image processing apparatus.

A policy server 103 is a server apparatus or server program which controls a user's access to a document file. "Access" herein means various operations (e.g., display, editing, and printing) on a document file. Client computers 104 and 105 (to be referred to as a client computer 104 hereinafter) are computers by which a user receives a document file from the multi-function copier 102 and operates the received document file.

For example, the multi-function copier 102 transmits a document file containing image data generated by reading a document to the client computer 104 across the network. The client computer 104 inquires of the policy server 103 about the access right (e.g., access policy definition information) of the user to the document file, and acquires the access right. In accordance with the acquired access right, the client computer 104 displays, edits, or prints the image data.

The above arrangement is of course an arrangement example which is presented in order to make the present invention easy to understand. That is, three or more client computers, and a plurality of multi-function copiers 102 may be provided on the network.

Figure 2:
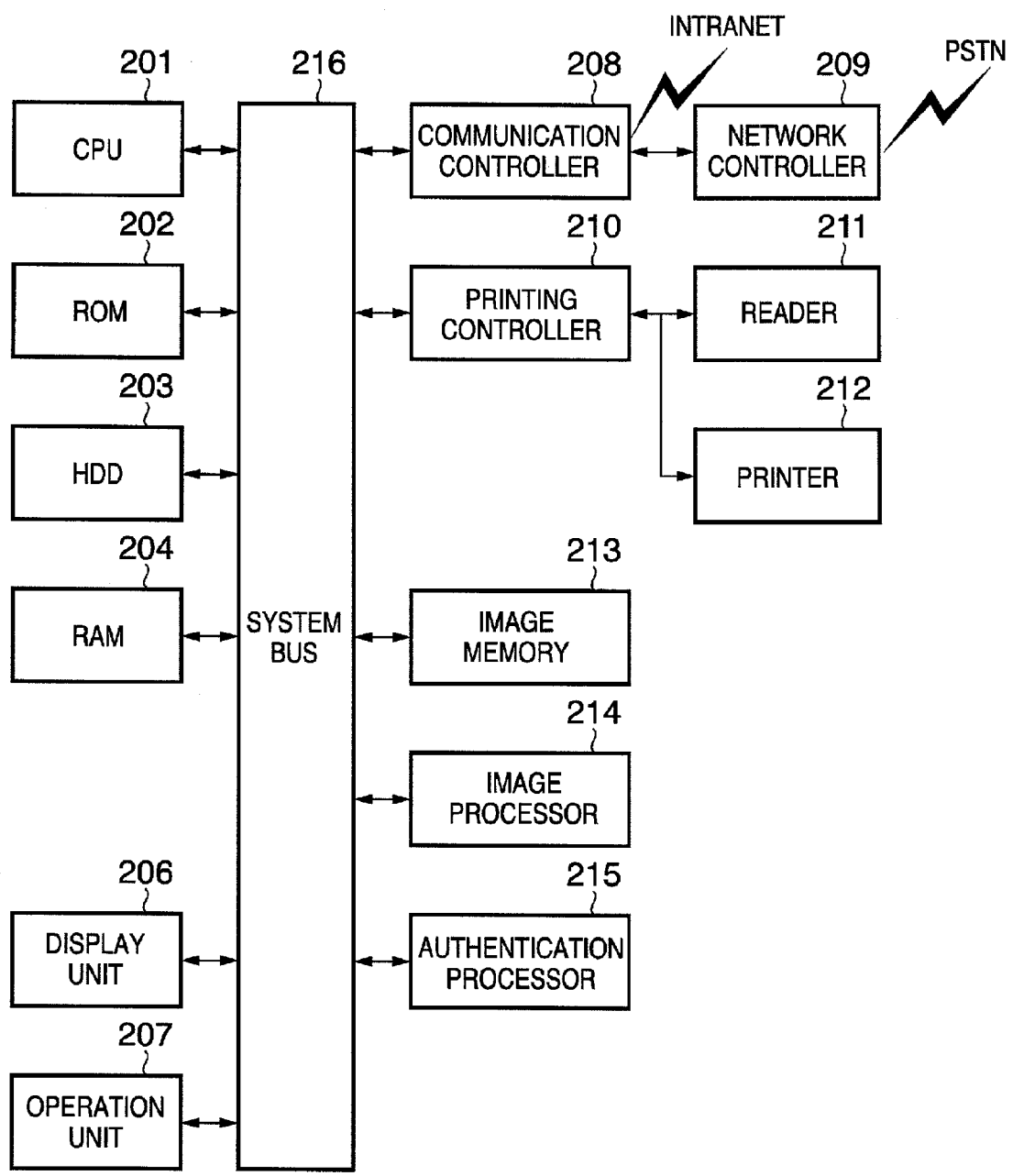
FIG. 2 is a block diagram showing an outline of the arrangement of an image processing apparatus according to the embodiment.

FIG. 2 is a block diagram showing an outline of the arrangement of the image processing apparatus according to the present embodiment. A CPU (Central Processing Unit) 201 is a central processing unit which comprehensively controls individual units connected to a system bus 216. A ROM (Read Only Memory) 202 is a nonvolatile memory which stores a control program and the like. A hard disk drive 203 is a large-capacity memory which stores various control programs and data. A RAM (Random Access Memory) 204 is a volatile memory which stores data necessary for the multi-function copier 102 to operate.

A display unit 206 is a display device which displays the driving conditions, the apparatus state, and various pieces of information such as input information. An operation unit 207 is an input device which allows an operator to input settings, instructions, and the like. The operation unit 207 comprises, e.g., keys such as a ten-key pad and start key, and/or a touch panel. The touch panel is mounted near the surface of the display unit 206.

A communication controller 208 is a communication circuit which connects to an intranet or the Internet across a wireless or wired network, and transmits and receives document data containing image data and control commands. A network controller 209 is a line connection controller which connects to a PSTN (Public Switched Telephone Network) as a public telephone line. The network controller 209 incorporates a modem, and executes facsimile transmission or reception by modulating or demodulating image data and control signals by using the modem.

A reader 211 is a scanner device which generates image data of a document image by photoelectrically converting reflected light from a document. A printing controller 210 controls the reader 211 and a printer 212. When image data is to be transmitted, the printing controller 210 transfers the image data to the communication controller 208. When image data is to be copied, the printing controller 210 transfers the image data to the printer 212. When image data is to be saved, the printing controller 210 saves the image data in the hard disk drive 203.

The printer 212 is a device which receives image data or printing data via the printing controller 210, and forms a permanent visible image on a printing sheet. Image data or printing data is received from an information source such as the reader 211 or client computer 104.

An image memory 213 is a memory which temporarily stores read image data, received image data, or printing data. Depending on the state of the multi-function copier 102, the hard disk drive 203 or RAM 204 may also function as the image memory 213.

An image processor 214 encodes image data to be transmitted by data compression, and decodes received image data by decompression. The image processor 214 may also convert received printing data into image data, and convert image data to be saved into an appropriate format or a format (e.g., a PDF format) designated by a user. The image processor 214 may also perform image correction corresponding to, e.g., the optical response characteristics or sensor variations of the reader 211. In addition, the image processor 214 may also execute image processing such as image magnification change operated by an operator from the operation unit 207. Furthermore, the image processor 214 may also execute so-called optimization which matches image data with the write characteristics of the printer 212.

An authentication processor 215 authenticates users and work groups, and also authenticates print jobs. The authentication processor 215 may also include a reader which reads a magnetic card or IC card in which a user ID or group ID is written. Alternatively, a biometrics device which executes biometrics can be used as the authentication processor 215. It is also possible to use authentication software which allows a user to input the user ID and password, and determines whether the input user ID and password are known.

Accordingly, the multi-function copier 102 includes a facsimile communication function of transmitting read image data, a transfer function of transferring image data to a document management server computer, and a copying function of printing out read image data. The multi-function copier 102 further includes a receiving/printing function of receiving image data by facsimile and printing the received data, and a printing function of receiving printing data from the client computer 104 and printing the received data. As described above, the multi-function copier 102 can thus be used not only as a copying machine but also as a facsimile apparatus, printer apparatus, and scanner apparatus.

Note that the present invention is not affected by the printing method of the printer 212. For example, the printer 212 can use any of various printing methods such as the inkjet method, thermal head method, and dot impact method, instead of the electrophotographic printing method.

Figure 3:
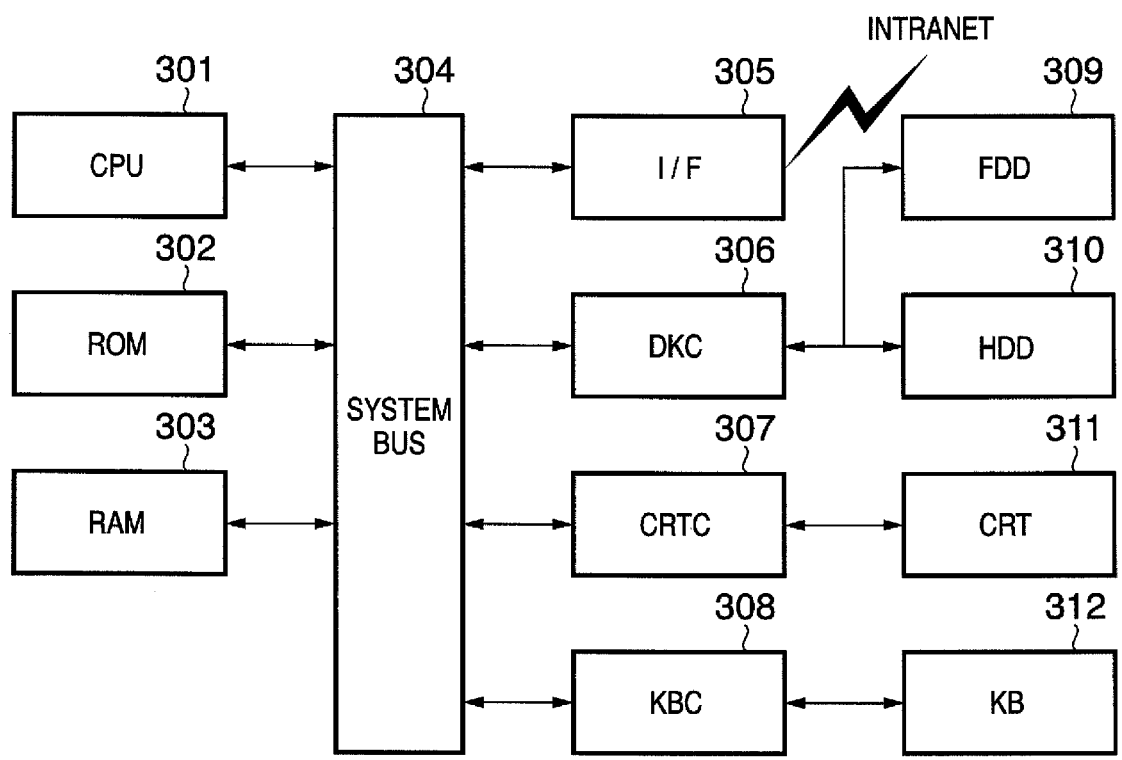
FIG. 3 is a block diagrams showing an outline of the arrangement of a client computer or policy server according to the embodiment.

FIG. 3 is a block diagram showing an outline of the arrangement of the client computer or policy server according to the embodiment. A CPU 301 is a central processing unit which comprehensively controls individual units connected to a system bus 304. A ROM 302 is a nonvolatile memory which stores a control program and the like. A hard disk drive 310 is a large-capacity storage device which stores various control programs and data. A RAM 303 is a volatile memory which functions as, e.g., a main memory and work memory of the CPU 301.

A host interface (I/F) 305 is a communication device which bidirectionally exchanges data with a local printer, a network printer, another network apparatus, or another PC. A disk controller (DKC) 306 is a controls access to the hard disk drive (HDD) 310 and a flexible disk drive (FDD) 309. The hard disk drive (HDD) 310 stores the boot program, various application software programs, edit files, and user files.

A CRT controller (CRTC) 307 is a controller which controls images to be displayed on a CRT display (CRT) 311. This display may be a liquid crystal display instead of a CRT. A command input controller (KBC) 308 is a controller which controls inputs from a keyboard (KB) 312, pointing device (not shown), and the like.

<File Transmission Process in Image Processing Apparatus>

Figure 4:
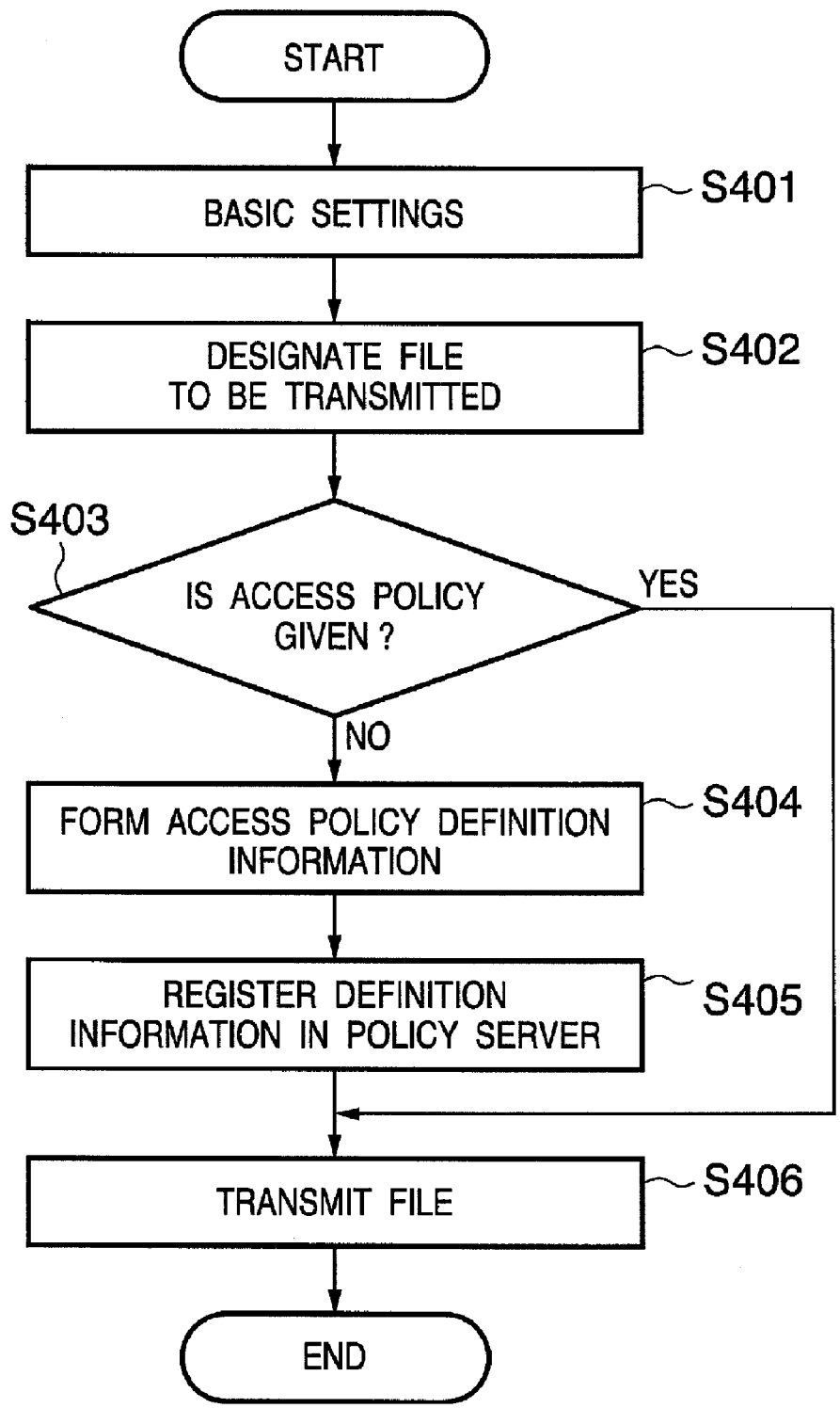
FIG. 4 is a flowchart exemplifying a file transmission process according to the embodiment.

FIG. 4 is a flowchart exemplifying a file transmission process according to the embodiment. This file transmission process is executed by the multi-function copier 102.

In step S401, the CPU 201 executes basic settings on the basis of input information from the operation unit 207. The basic settings include, e.g., the setting of a destination (a receiver ID or e-mail address), and the setting of the access policy of each receiver with respect to a file. The access policy includes the acceptance/rejection of display, editing, and printing, the valid period of a file, and the like.

Figure 5:
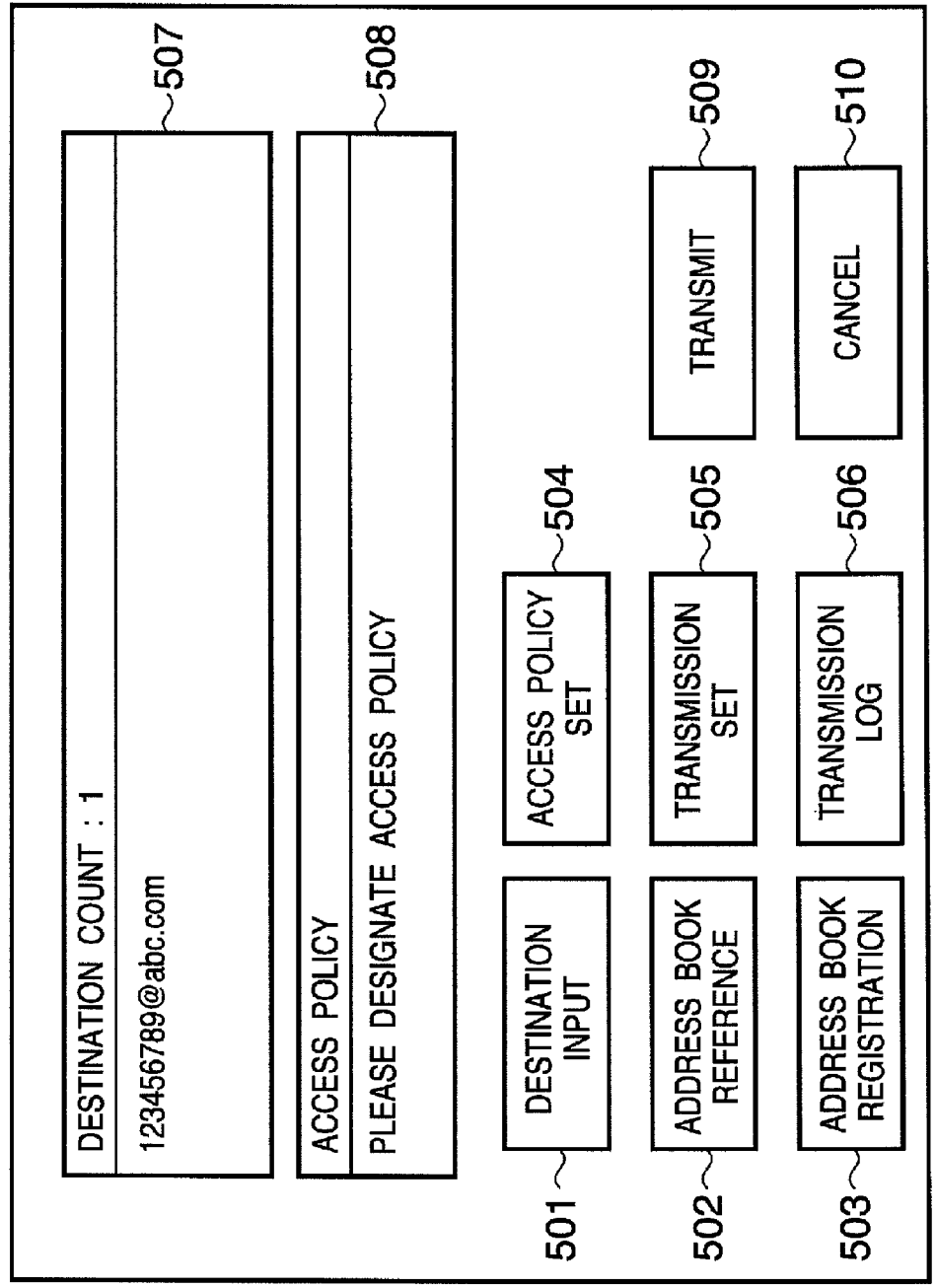
FIG. 5 is a view showing an example of a user interface according to the embodiment.

FIG. 5 is a view showing an example of a user interface according to the embodiment. This user interface is implemented by the display unit 206 and operation unit 207. Reference numerals 501 to 506 denote buttons for various operations and settings. When a destination input button 501 is pressed, the CPU 201 displays a destination input window on the display unit 206, and the user inputs destination information from the operation unit 207. The destination input window displays keys for inputting alphanumerical characters and the like.

When an address book reference button 502 is pressed, the CPU 201 reads out a preregistered address book from the hard disk drive 203, and displays the readout address book on the display unit 206. Subsequently, the CPU 201 stores one of the displayed mail addresses which is designated from the operation unit 207 as a destination in the RAM 204.

When an address book registration button 503 is pressed, the CPU 201 displays a window for inputting a user name, mail address, and the like on the display unit 206. Note that keys for inputting alphanumerical characters and the like are displayed in this input window. The CPU 201 generates a new user ID, and registers it in association with the user name and mail address input from the operation unit 207 in the address book. The address book is stored in the hard disk drive 203.

FIG. 6 is a view showing an example of the address book (user table) according to the embodiment. This address book is stored as a user table in the hard disk drive 203. Also, in this address book as shown in FIG. 6, a unique user ID, user name, and mail address are stored as they are associated with each other.

When an access policy set button 504 is pressed, the CPU 201 displays an access policy setting window on the display unit 206. In this setting window, the operator can manually set, in the multi-function copier 102, information concerning an access policy required to form definition information.

This setting window may also include a radio box for designating, e.g., the acceptance/rejection of display, editing, and printing. The setting window may also include a text box or calendar for inputting the valid period. Note that when an access policy is given, the CPU 201 sets 1 in a flag indicating that the access policy is given, and stores the flag in the RAM 204. "Give an access policy" is equivalent to setting the access right of each user or each group with respect to a desired file. An access policy is normally given to a document file when a document ID which uniquely specifies the file and definition information (definition elements) pertaining to the access right are registered in the policy server 103. In this specification, however, an access policy is given even when information necessary to define the access policy is input, designated, or selected by the operator. By contrast, if no information necessary to define an access policy is input, designated, or selected by the operator, the CPU 201 determines that no access policy is given.

If no access policy is given, the CPU 201 sets 0 in the flag, and stores the flag in the RAM 204. If an access policy is given, the CPU 201 forms definition information for defining the access policy, and stores the definition information in the hard disk drive 203. In addition, the CPU 201 transmits a registration request containing the definition information to the policy server 103. In this manner, the access policy of a file to be transmitted is managed by the policy server 103.

When a transmission set button 505 is pressed, the CPU 201 displays a transmission setting window on the display unit 206. This transmission setting window includes a text box for inputting information such as a document name, text, and reply destination.

When a transmission log button 506 is pressed, the CPU 201 reads out the log of transmission jobs executed by the log-in user in the past from the hard disk drive 203, and displays the readout log on the display unit 206. Note that the CPU 201 executes an authentication process by allowing the operator to input the user ID and password via the authentication processor 215.

In a destination display field 507, the CPU 201 displays the address (e.g., the mail address or receiver's user name) designated from the operation unit 207. In a control information display field 508, the CPU 201 displays the access policy set from the operation unit 207. Note that if no access policy is designated, the CPU 201 keeps the field blank or displays a message meaning "not yet set". When a cancel button 510 is pressed, the CPU 201 terminates the basic setting process.

In step S402, the CPU 201 designates a file to be transmitted in accordance with the designation from the operation unit 207. For example, when a transmit button 509 is pressed, the CPU 201 causes the reader 211 to read a document image, and forms a file storing the image data to be transmitted. Note that the CPU 201 may also select and transmit a file stored in the hard disk drive 203. In this case, the CPU 201 displays a list of files on the display unit 206, and accepts the designation of one or more files from the operation unit 207. The file can comprise image data and/or document data.

In step S403, the CPU 201 determines whether an access policy is given to the file to be transmitted. For example, the CPU 201 reads out the flag stored in the RAM 204, and determines whether an access policy is given. If an access policy is given, the flow advances to step S406. If no access policy is given, the flow advances to step S404.

In step S404, the CPU 201 forms access policy definition information. For example, the CPU 201 displays a message for prompting the operator to give an access policy on the display unit 206, and waits until information necessary to form definition information is input. If the necessary information is input, the CPU 201 forms definition information. Note that the CPU 201 may also generate identification information (e.g., a document ID) of the file to be transmitted, and attach the identification information to the definition information. This makes it possible to define an access policy unique to each file. Note that the CPU 201 may also embed the document ID in the file to be transmitted.

In step S405, the CPU 201 transmits a registration request containing the definition information to the policy server 103. In step S406, the CPU 201 forms an e-mail message having the file to be transmitted as an attached file, and transmits the e-mail to the destination.

Note that the document ID of the file to be transmitted may be contained in the definition information formed in step S404 in the above description, the document ID may also be generated by the policy server 103. This document ID transmitted from the policy server may be contained in the definition information of the file to be transmitted. When the document ID is thus generated by the policy server 103, the document ID can be unique to a file whose policy is managed by the policy server 103.

In this embodiment as described above, if no access policy is given to a file to be transmitted, the load on the operator is reduced by forming definition information which defines an access policy. That is, even when the operator omits the setting of an access policy in the basic setting process, the multi-function copier 102 almost automatically forms definition information and registers it in the policy server. Accordingly, the invention according to this embodiment can alleviate the complexity of the operation of giving an access policy.

Figure 7:
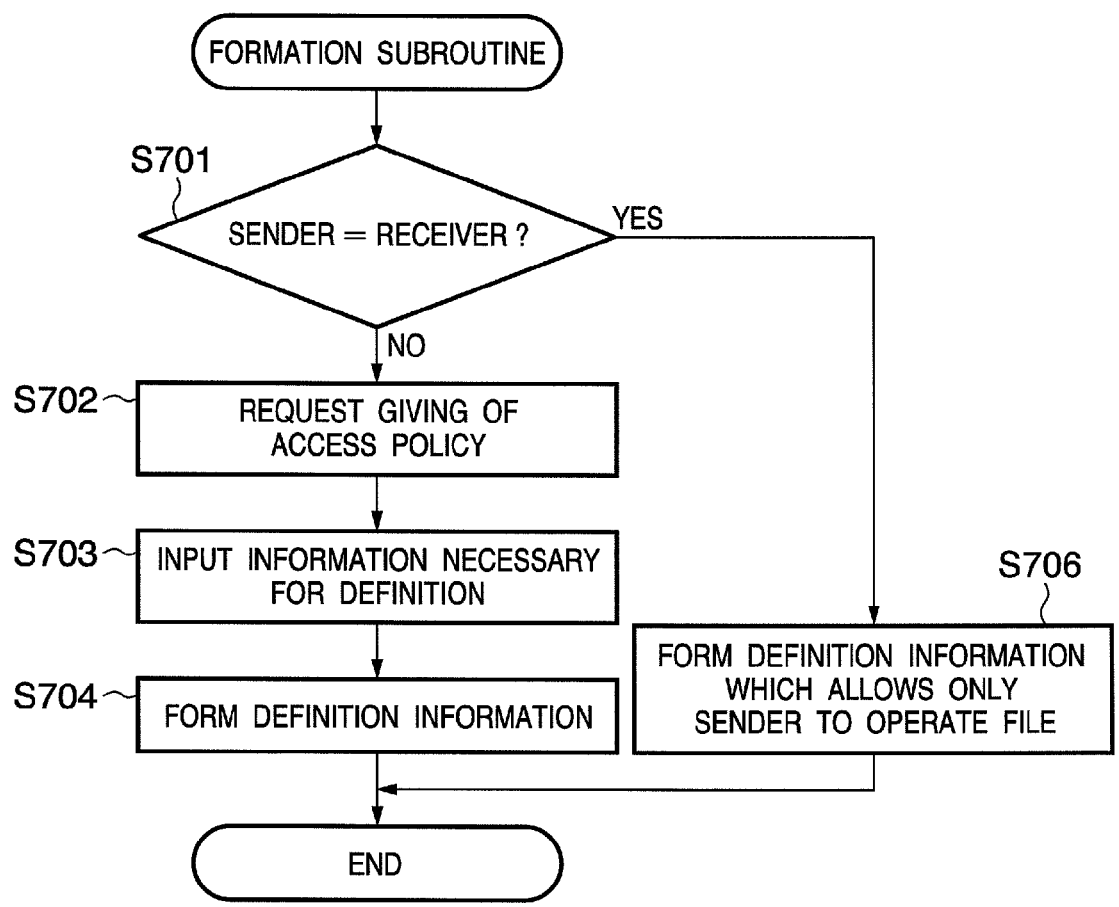
FIG. 7 is a flowchart exemplifying an access policy definition information formation process according to the embodiment.

FIG. 7 is a flowchart exemplifying an access policy definition formation process according to the embodiment. This formation process corresponds to step S404 described above.

In step S701, the CPU 201 determines whether identification information of a sender (an operator who has logged in to the multi-function copier 102) obtained via the authentication processor 215 matches identification information of a receiver input from the operation unit 207. If the sender and receiver match, this means that the sender is going to transmit a file to himself or herself. In this case, therefore, the flow advances to step S706, and the CPU 201 forms definition information for allowing only the sender to operate (e.g., display, edit, and print) the file to be transmitted. If the sender and receiver do not match, the flow advances to step S702.

In step S702, the CPU 201 displays a message (e.g., a display window) for requesting the user to give an access policy on the display unit 206. In step S703, the CPU 201 accepts, from the operation unit 207, information required to define an access policy to be applied to the receiver. Note that the CPU 201 may also accept necessary information about definition of an access policy to be applied to the sender. If a plurality of receivers are registered as destinations, the CPU 201 can form definition information unique to each receiver, or definition information common to all the receivers. In this case, necessary information is designated for each individual receiver. The necessary information contains, e.g., the acceptance/rejection of display, editing, and printing, and the valid period of the access policy.

In step S704, the CPU 201 forms definition information on the basis of the information input from the operation unit 207. This definition information contains, e.g., a user ID for identifying the user, a document ID for identifying the file, and information concerning the acceptance/rejection of display and the like.

In this embodiment, the operator is prompted to input data only when the sender and receiver do not match. This can further reduce the load on the user. For example, when the sender and receiver match, the multi-function copier 102 automatically forms definition information which allows only the sender to have the right to access a file to be transmitted, thereby minimizing the input operation by the operator.

Figure 8A:
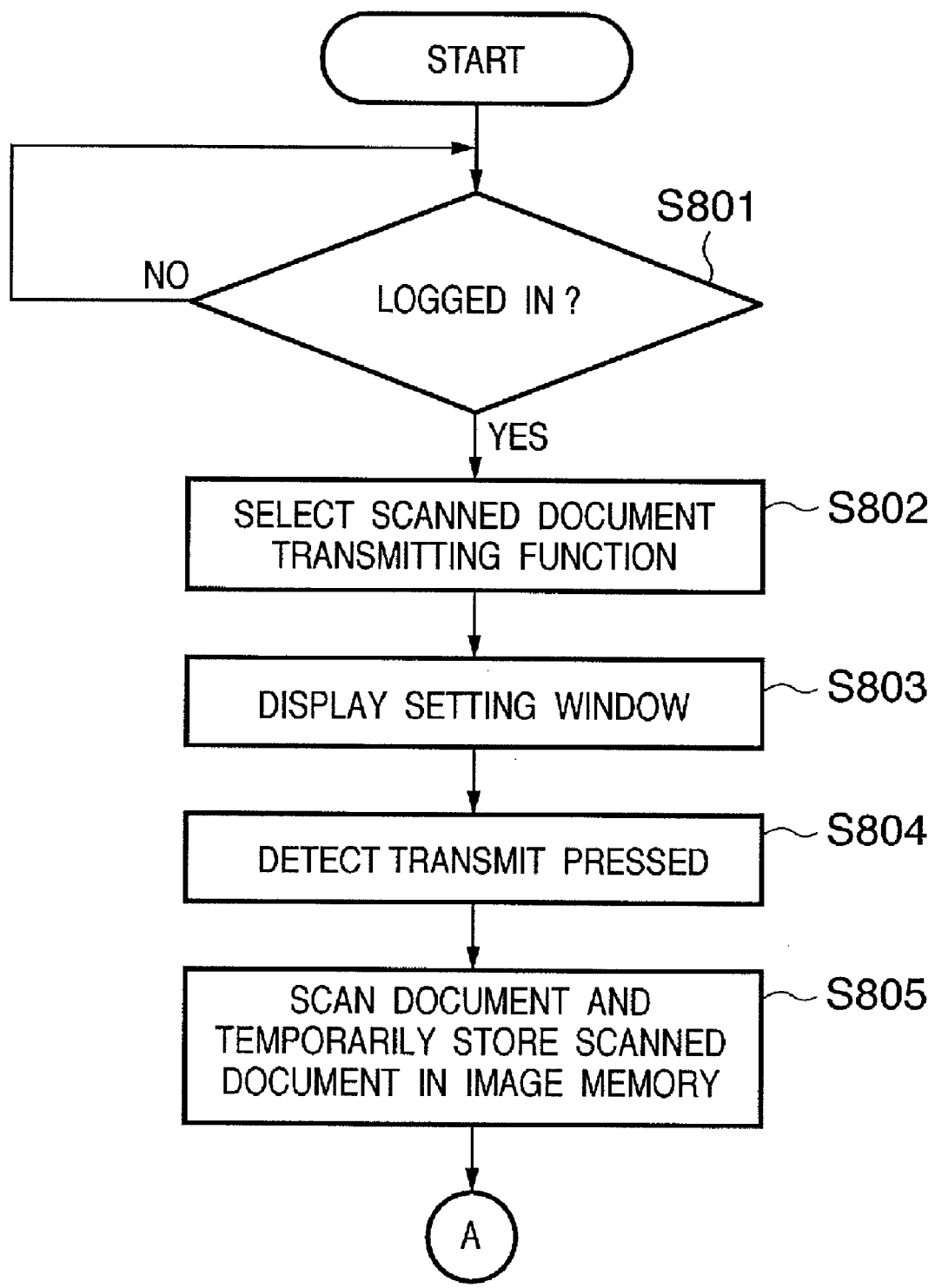

FIGS. 8A and 8B are flowcharts exemplifying another file transmission process according to the embodiment. Note that the explanation will be simplified by denoting the already explained steps by the same reference numerals. Note also that steps S801 to S805 below are examples of concepts lower than steps S401 to S402 described above.

First, in step S801, the CPU 201 determines whether the operator has logged in via the authentication processor 215. If the operator has logged in, the flow advances to step S802 from the loop in step S801. In step S802, the CPU 201 detects that a scanned document transmission function is selected from the operation unit 207, and activates an application program for transmission.

In step S803, the CPU 201 displays the basic setting window (FIG. 5) on the display unit 206. In this window, the operator can set a transmission destination, the contents of transmission, and the like. In addition, as explained above with reference to FIG. 5, information for defining an access policy may also be input in this basic setting window. The CPU 201 may also read out definition information pertaining to the existing access policy from the hard disk drive 203, and display the readout information on the display unit 206. In this case, the operator can select or designate the existing access policy from the operation unit 207, and this will save him or her the trouble of inputting information necessary for definition. If the existing access policy is designated, identification information (e.g., a policy ID) for identifying the access policy is stored in the RAM 204.

If the CPU 201 detects in step S804 that the transmit button 509 included in the basic setting window is pressed, the flow advances to step S805. In step S805, the CPU 201 instructs the printing controller 210 to scan a document. The printing controller 210 drives the reader 211 to read a document image. The output data from the reader 211 is temporarily stored in the image memory 213. Note that the CPU 201 may also embed a document ID in the image file stored in the image memory 213. After that, the CPU 201 executes step S403.

If the CPU 201 determines in step S403 that an access policy is given, the flow advances to step S806. In step S806, the CPU 201 executes the same processing as in step S706. If the CPU 201 determines in step S403 that no access policy is given, the flow advances to step S807.

In step S807, the CPU 201 determines whether the existing access policy is designated. If the existing access policy is designated, the flow advances to step S808. In step S808, the CPU 201 reads out identification information of the designated access policy from the RAM 204, and the flow advances to step S405. If no existing access policy is designated, the flow advances to step S404. In step S404, the CPU 201 forms definition information reflecting the contents set by the user, and the flow advances to step S405.

In step S405, the CPU 201 forms a registration request command containing the formed definition information (S404, S706) or the identification information of the existing access policy, and transmits the command to the policy server 103.

In step S812, the CPU 201 determines whether the registration of the access policy definition information is successful. This determination can be done on the basis of a success notification or failure notification transmitted from the policy server 103. If the registration is successful, the flow advances to step S406, and the CPU 201 reads out the scanned image from the image memory 213, and transmits the readout image by attaching it to e-mail. After that, the flow advances to step S816, and the CPU 201 displays a message representing the transmission completion on the display unit 206.

On the other hand, if the registration has failed, the flow advances to step S813, and the CPU 201 displays, on the display unit 206, a message indicating that the access policy is not successfully given to the file to be transmitted. In step S814, the CPU 201 deletes the scanned image from the image memory 213.

In this embodiment as described above, the existing access policy can be used, and this saves the user the trouble of inputting detailed information necessary for definition.

Note that although FIG. 7 shows a practical example of step S404, the subroutine shown in FIG. 7 may also be used instead of step S806. This similarly applies to a subroutine shown in FIG. 9 or 10 to be explained below.

Figure 9:
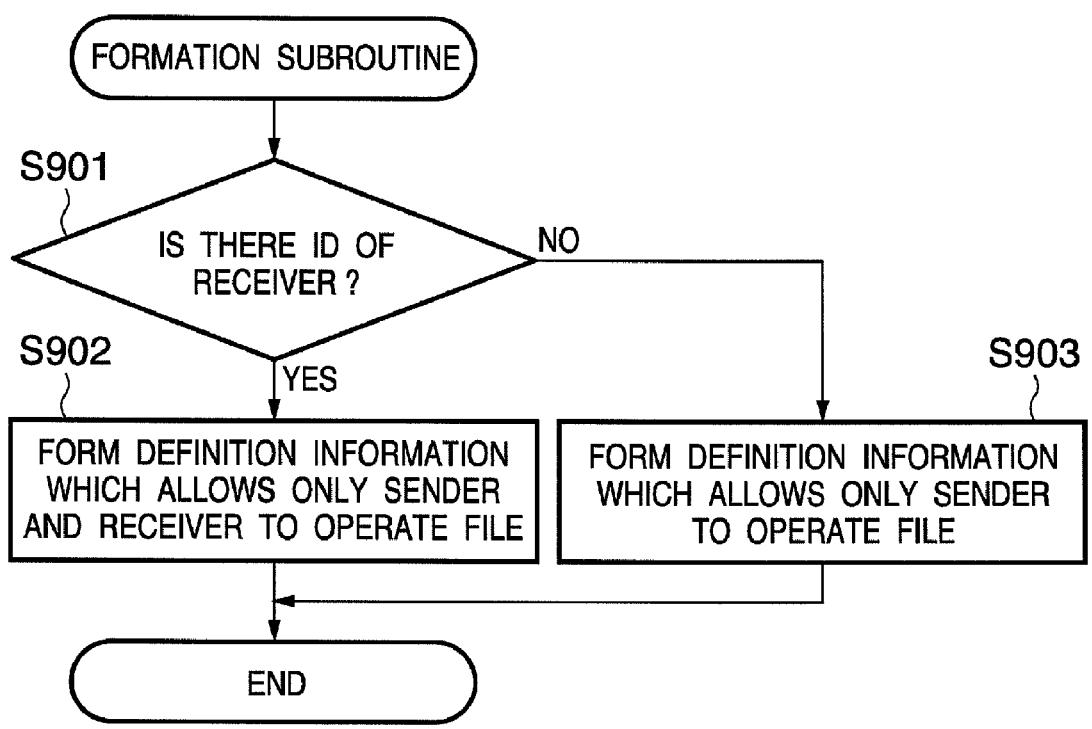
FIG. 9 is a flowchart exemplifying another access policy definition information formation process according to the embodiment.

FIG. 9 is a flowchart exemplifying another access policy definition information formation process according to the embodiment. This flowchart is a substitute for the subroutine shown in FIG. 7.

In step S901, the CPU 201 searches the user table (FIG. 6) for the user ID of the receiver designated as a destination, and extracts the user ID. If the receiver's user ID is successfully extracted, the flow advances to step S902, and the CPU 201 forms definition information which allows only the sender and receiver to operate the file to be transmitted. If the extraction of the receiver's user ID has failed, the flow advances to step S903, and the CPU 201 forms definition information which allows only the sender to operate the file to be transmitted.

In this embodiment, an access policy which prevents a user not preregistered in the user table from operating a document file is automatically formed. Therefore, even if a file is transmitted to an unregistered user, it is possible to inhibit the user from operating the file. In addition, if the receiver is a registered user, the multi-function copier 102 automatically forms definition information which allows only the sender and receiver to operate the file. This can reduce the load on the operator of the multi-function copier 102.

Figure 10:
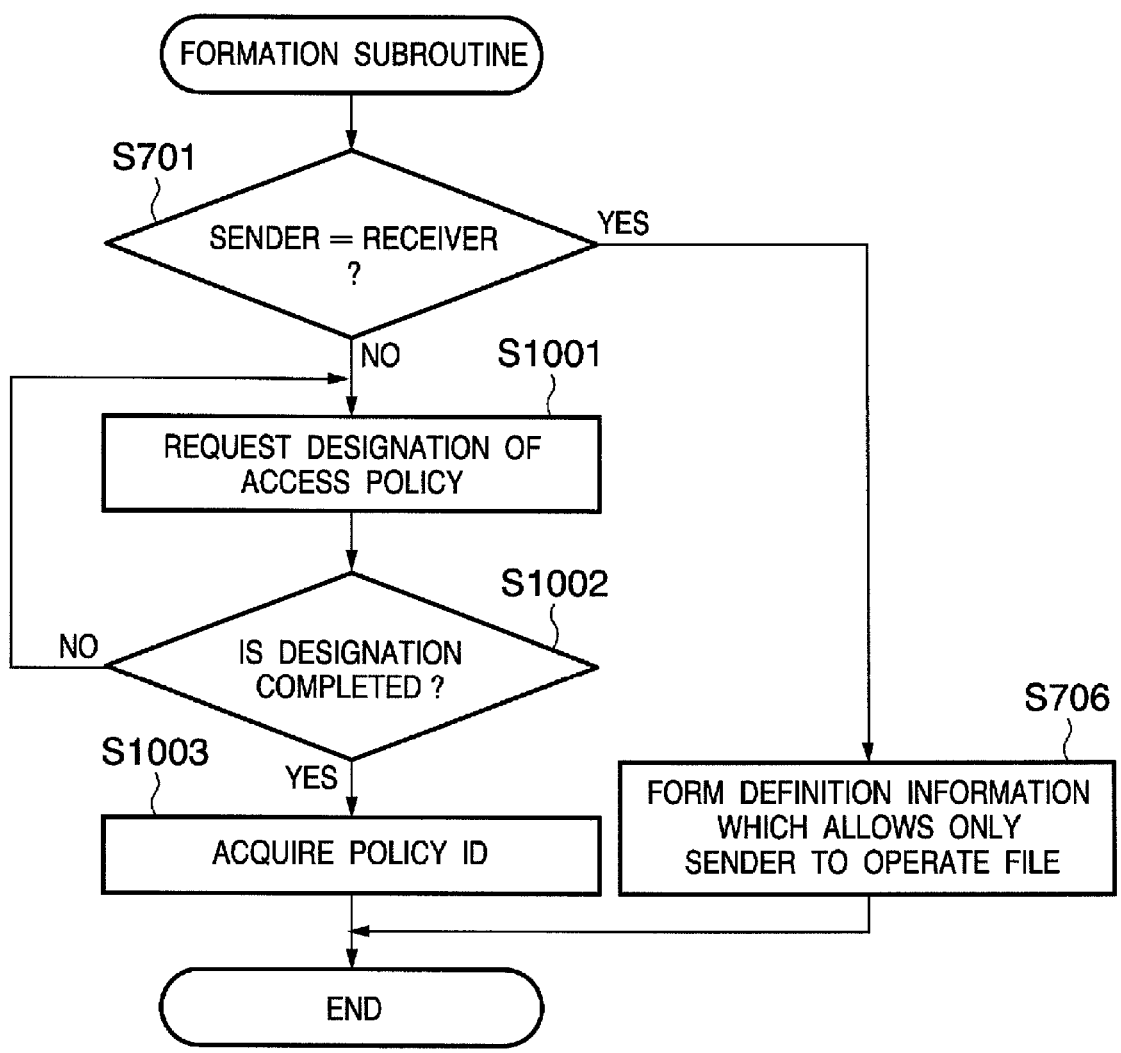
FIG. 10 is a flowchart exemplifying still another access policy definition information formation process according to the embodiment.

FIG. 10 is a flowchart exemplifying still another access policy definition information formation process according to the embodiment. This flowchart is a substitute for the subroutine shown in FIG. 7 or 9. Note that an explanation will be simplified by denoting the already explained steps by the same reference numerals as above.

If the sender and receiver do not match in step S701, the flow advances to step S1001. In step S1001, the CPU 201 displays, on the display unit 206, a window for requesting the operator to designate the existing access policy. Since a plurality of access policy candidates are displayed in this window, the operator can selectively designate one access policy from the operation unit 207. For example, the first access policy permits all operations, and the second access policy permits only display. Note that these access policies are merely examples.

In step S1002, the CPU 201 determines whether an access policy is designated from the operation unit 207. If no access policy is designated, the flow returns to step S1001. If an access policy is designated, the flow advances to step S1003, and the CPU 201 acquires a policy ID for identifying definition information of the designated access policy.

In this embodiment, when a file is to be transmitted to a user except for the sender, a preregistered access policy can be designated. This advantageously saves the user the trouble of inputting detailed information for forming definition information.

Figure 11:
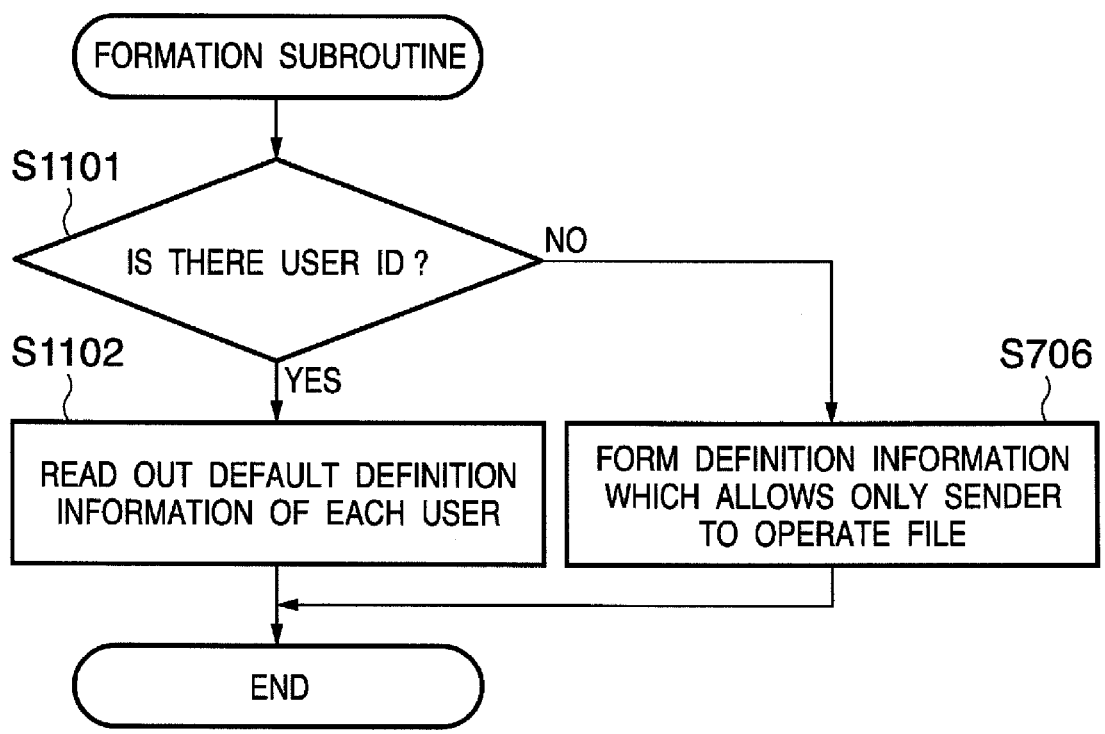
FIG. 11 is a flowchart exemplifying an access policy definition information acquisition process according to the embodiment.

FIG. 11 is a flowchart exemplifying the access policy definition information acquisition process according to the embodiment. This flowchart is a substitute for the subroutine shown in FIG. 7 or 9. In this processing shown in FIG. 11, if no access policy is given in the basic setting window, a default access policy which is preregistered for each user is applied to a file.

In step S1101, the CPU 201 extracts the user ID of the receiver set as a destination from the user table. If the user ID cannot be extracted, the CPU 201 executes step S706. If the user ID can be extracted, the flow advances to step S1102, and the CPU 201 reads out default definition information from the hard disk drive 203.

FIG. 12 is a view showing an example of the table storing default definition information according to the embodiment. As shown in FIG. 12, default information concerning the acceptance/rejection of various operations and the valid period is stored in association with a user ID.

In this embodiment as described above, an access policy can be automatically given to a file to be transmitted by preregistering default definition information for each user (each sender and each receiver). As a consequence, the load on the user when an access policy is to be given can be made lighter than in the conventional methods.

<Policy Server>

The main operations of the policy server will be explained below. Examples of the main operations are the process of registering access policy definition information, and the process of transmitting the contents of an access policy to a client.

Figure 13:
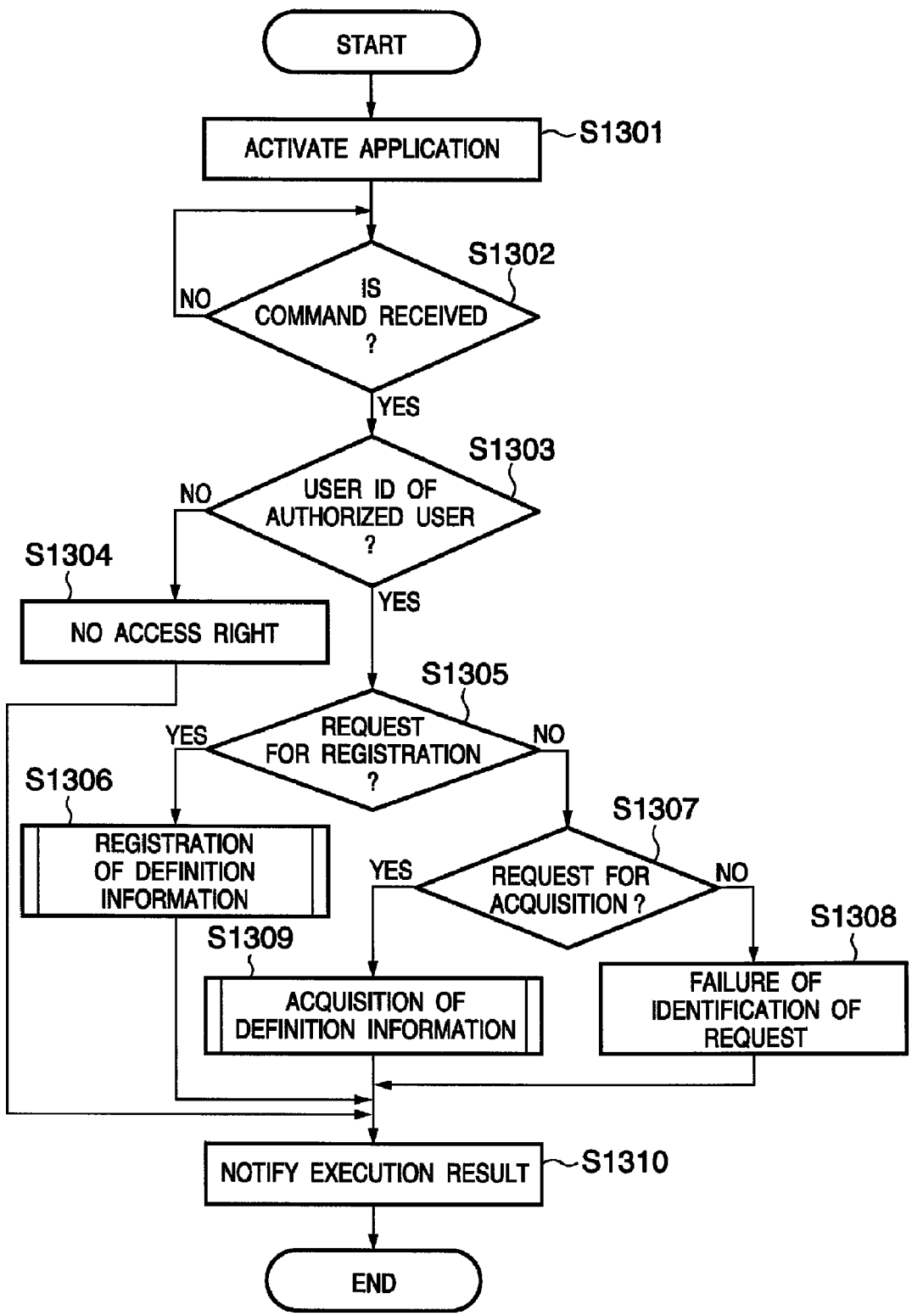
FIG. 13 is a flowchart showing an example of the data processing sequence of the policy server according to the embodiment.

FIG. 13 is a flowchart showing an example of the data processing sequence of the policy server according to the embodiment.

In step S1301, the CPU 301 activates a server application program. This program is stored in the hard disk drive 310. In step S1302, the CPU 301 waits until a command transmitted from the multi-function copier 102 or client computer 104 is received.

FIG. 14 is a view showing an example of the command according to the embodiment. Referring to FIG. 14, the command length is information indicating the size of the command. The access user ID is information for identifying a user who accesses the policy server 103. The request ID is information for identifying the type of request. Examples are a request for registration of definition information to be applied to a document file designated by the document ID, and a request for acquisition of the definition information. The definition information acquisition request is a so-called access policy inquiry. The document ID is information for identifying a document file. The policy ID is information for identifying the existing access policy. The element count is the number of definition elements to be registered. The definition element is access policy definition information set or formed for each user. One definition element contains information such as the user ID, the acceptance/rejection of display, editing, and printing, and the start and end of the valid period.

Note that the client computer 104 transmits various commands to the policy server 103. Assume, for example, that the server application is a WEB application. In this case, the WEB browser of the client computer 104 transmits a WEB window acquisition request command. The server application transmits window information (e.g., an Html file and image data) to the WEB browser.

FIG. 15 is a view showing an example of an ID management table according to the embodiment. As shown in FIG. 15, this table stores document IDs and policy IDs in association with each other. The ID management table is stored in the hard disk drive 310.

FIG. 16 is a view showing an example of a definition information table according to the embodiment. As shown in FIG. 16, this table contains a policy ID for identifying each access policy, the ID of a user to whom the access policy is applied, and various definition elements.

When the command is received via the communication I/F 305, the flow advances to step S1303. In step S1303, the CPU 301 analyzes the command, extracts the user ID of the access user contained in the command, and determines whether the user ID is the ID of an authorized user. Assume that all the IDs of users permitted to use the policy server 103 are preregistered in, e.g., a user list. This user list is stored in the hard disk drive 310. If the user is not an authorized user, the flow advances to step S1304, and the CPU 301 forms a message indicating "no access right". If the command is transmitted from an authorized user, the flow advances to step S1305.

In step S1305, the CPU 301 extracts a request. ID contained in the command, and determines whether the request is a definition information registration request for the designated document file. If the request is the registration request, the flow advances to step S1306, and the CPU 301 generates a policy ID, and registers it together with the document ID, user ID, and definition information in the definition information table (FIG. 16). Also, the CPU 301 registers the generated policy ID and document ID in the ID management table (FIG. 15).

If the request is not the registration request, the flow advances to step S1307, and the CPU 301 determines whether the request is a request for acquisition of definition information set in the designated document. If the request is not the acquisition request, the flow advances to step S1308, and the CPU 301 forms a message indicating the failure of identification of the request.

If the request is the acquisition request, the flow advances to step S1309, and the CPU 301 reads out a policy ID corresponding to the document ID from the ID management table (FIG. 15), and also reads out definition information corresponding to the policy ID from the definition information table (FIG. 16).

In step S1310, the CPU 301 returns the execution result of the command to the apparatus which has transmitted the command. For example, the CPU 301 returns the failure message, the successfully acquired definition information, or the like.

Figure 17:
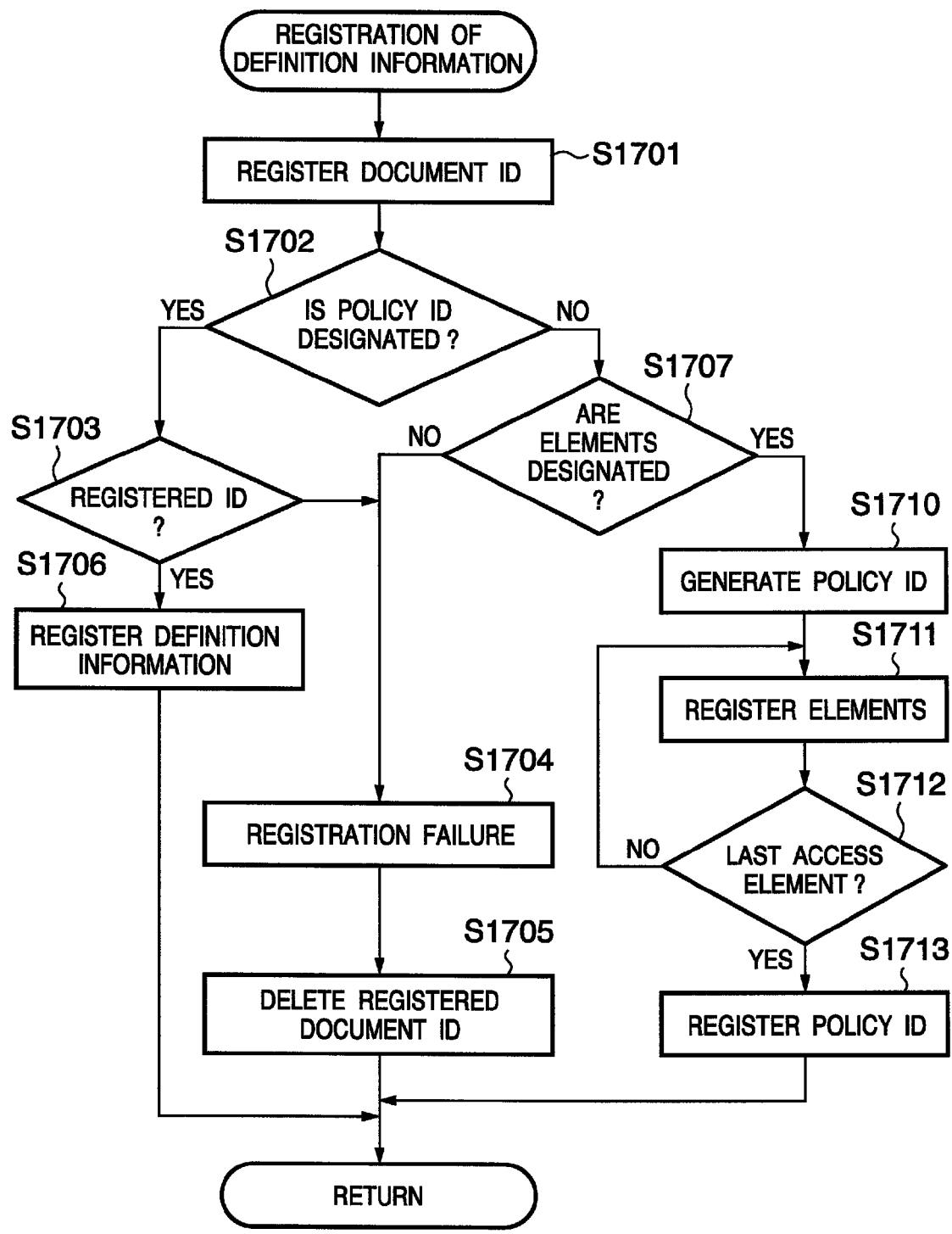
FIG. 17 is a flowchart exemplifying a definition information registration process according to the embodiment.

FIG. 17 is a flowchart exemplifying the definition information registration process according to the embodiment. This flowchart shows step S1306 as a subroutine.

In step S1701, the CPU 301 registers the document ID designated by the command in the ID management table (FIG. 15).

In step S1702, the CPU 301 determines whether a policy ID is designated by the command. If a policy ID is designated, the flow advances to step S1703, and the CPU 301 searches the definition information table for the designated policy ID, and determines whether the policy ID is already registered. If the policy ID is not registered, the flow advances to step S1704, and the CPU 301 forms a message indicating that the registration of the definition information has failed. Then, the flow advances to step S1705, and the CPU 301 deletes the registered document ID from the ID management table, and returns to the original processing.

On the other hand, if the policy ID is registered in step S1703, the flow advances to step S1706. In step S1706, the CPU 301 registers the policy ID in the ID management table in association with the designated document ID, and returns to the original processing.

If no policy ID is designated in step S1702, the flow advances to step S1707. In step S1707, the CPU 301 determines whether elements forming the definition information are designated by the command. If no elements are designated, the flow advances to step S1704 described above. If elements are designated, the flow advances to step S1710. In step S1710, the CPU 301 generates a policy ID, and registers it in the definition information table.

In step S1711, the CPU 301 registers the definition elements (e.g., the user ID, the acceptance/rejection of execution of each operation, and the valid period) read out from the command into the definition information table in association with the policy ID.

In step S1712, the CPU 301 determines whether the last definition element designated by the command has been completely registered. If there is an unregistered definition element, the flow returns to step S1711, and the CPU 301 registers the next definition element in the definition information table. If all the definition elements have been registered, the flow advances to step S1713. In step S1713, the CPU 301 registers the policy ID in the ID management table in association to the document ID, and returns to the original processing.

Figure 18:
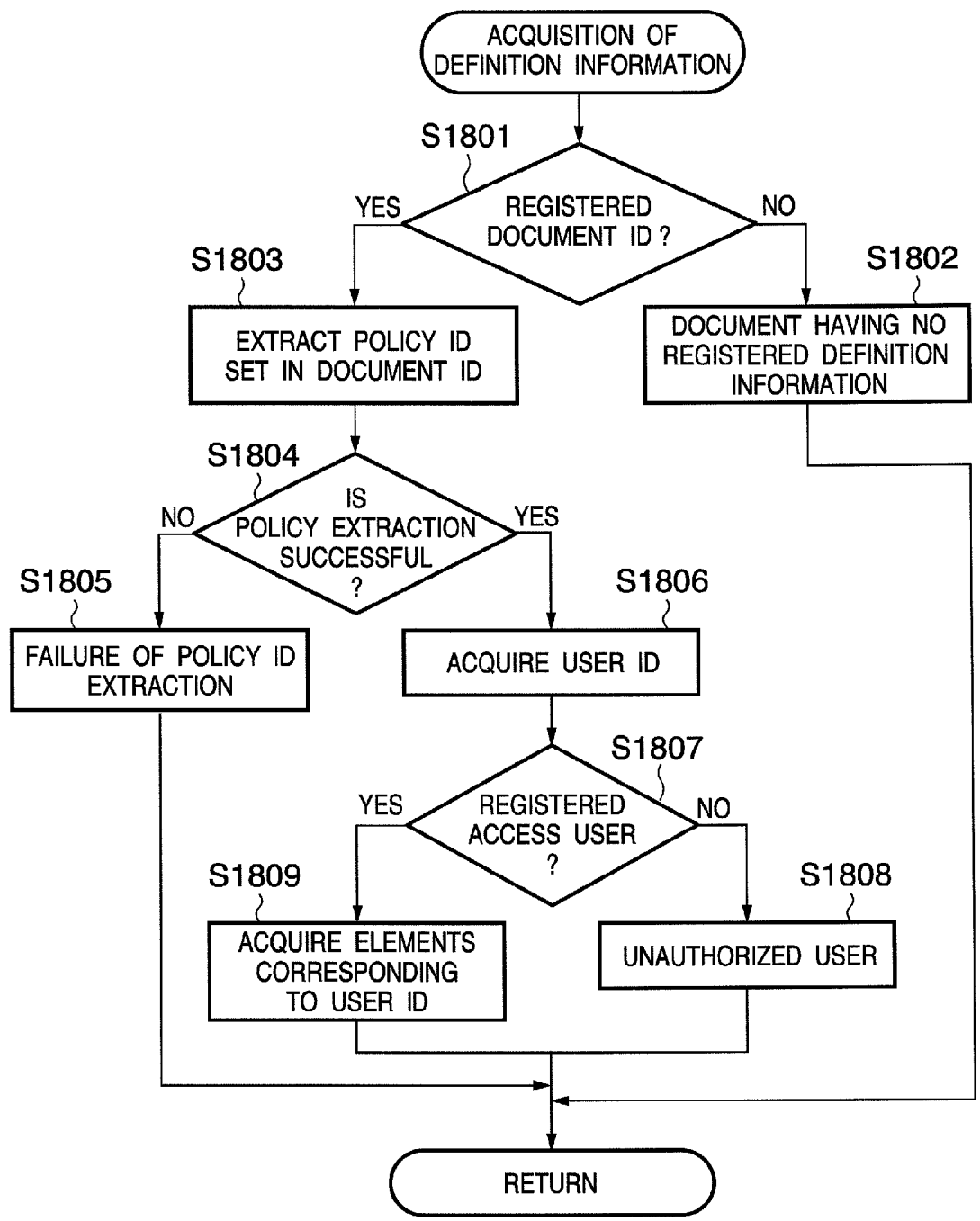
FIG. 18 is a flowchart exemplifying an access policy definition information acquisition process according to the embodiment.

FIG. 18 is a flowchart exemplifying the access policy definition information acquisition process according to the embodiment. This flowchart is a subroutine associated with step S1309.

In step S1801, the CPU 301 determines whether the document ID designated by the command is registered in the ID management table. If the document ID is not registered, the flow advances to step S1802, and the CPU 301 forms a message indicating that the document is not registered. If the document ID is registered, the flow advances to step S1803, and the CPU 301 extracts a policy ID corresponding to the designated document ID from the ID management table.

In step S1804, the CPU 301 determines whether the policy ID is successfully extracted. If the extraction has failed, the flow advances to step S1805, and the CPU 301 forms a message indicating the failure of extraction of the policy ID, and returns to the original processing.

On the other hand, if the extraction of the policy ID is successful, the flow advances to step S1806, and the CPU 301 extracts a user ID corresponding to the policy ID from the definition information table. In step S1807, the CPU 301 determines whether the extracted user ID matches the user ID of the access user designated by the command, thereby determining whether the sender of the command is an authorized user. If the two IDs do not match, the CPU 301 forms a message indicating that the sender is not an authorized user. If the two IDs match, the flow advances to step S1809, and the CPU 301 acquires definition elements corresponding to the user ID from the definition information table.

<Client Computer>

When a command is input in the window of the WEB browser, the client computer 104 transmits the input command to the policy server 103. Alternatively, when the user is going to open a document file given an access policy, a client WEB application starts. This application extracts the document ID from the document file. The application also generates a command containing a definition information acquisition request in addition to the user ID input from the operation unit, and transmits the command to the policy server 103. In this manner, it is possible to check the acceptance/rejection of display of a document for each user.

Figure 19:
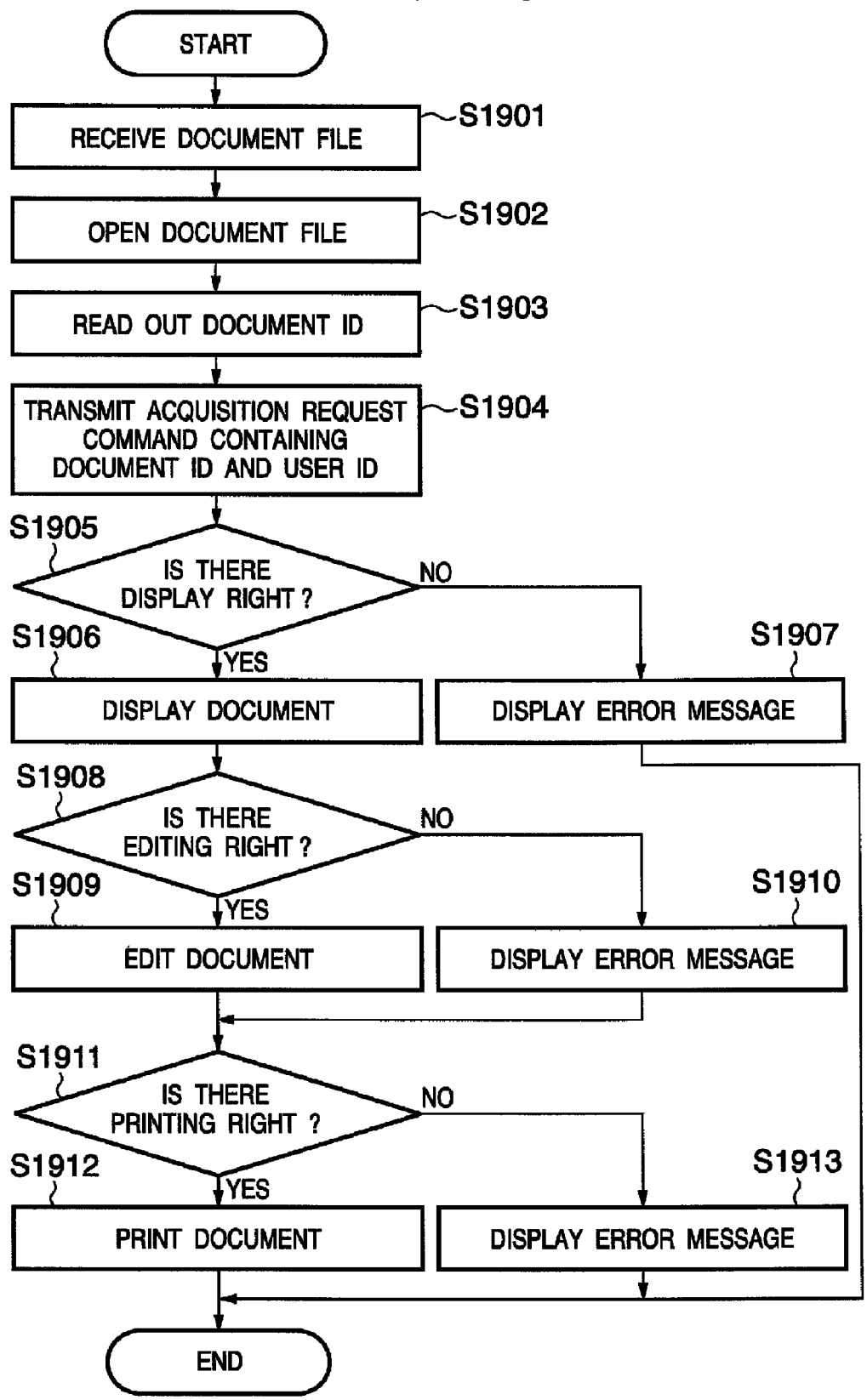
FIG. 19 is a flowchart exemplifying document file operations according to the embodiment.

FIG. 19 is a flowchart exemplifying the document file operations according to the embodiment.

In step S1901, the CPU 301 receives a document file from the multi-function copier 102 via the communication I/F 305. In step S1902, the CPU 301 opens the document file in response to a file open instruction input from the keyboard 312 or pointing device. In step S1903, the CPU 301 reads out the document ID from the document file.

Figure 20:
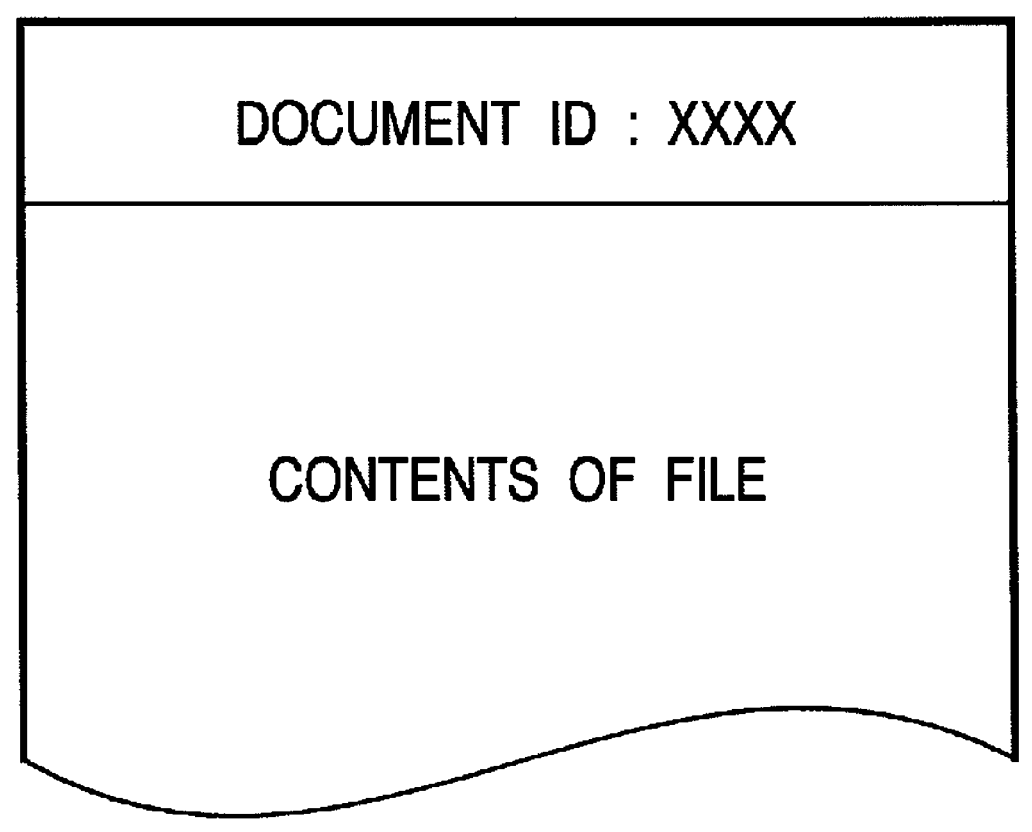

FIG. 20 is a view showing an example of the document file according to the embodiment. The document file contains image data and document data in addition to the document ID.

In step S1904, the CPU 301 forms a definition information acquisition request command containing the user ID of the operator who has logged in to the client computer 104 and the document ID, and transmits the command to the policy server 103. In step S1905, the CPU 301 determines whether there is a display right on the basis of the information received from the policy server 103. If there is a display right, the flow advances to step S1906, and the CPU 301 displays the contents of the document on the CRT 307 which is a display unit. If there is no display right, the flow advances to step S1907, and the CPU 301 displays an error message.

Then, if the operator requests editing from the keyboard 312 or the like, the flow advances to step S1908, and the CPU 301 determines whether there is an editing right on the basis of the information received from the policy server 103. If there is an editing right, the flow advances to step S1909, and the CPU 301 accepts the operation of editing the contents of the document from the keyboard 312. If there is no editing right, the flow advances to step S1910, and the CPU 301 displays an error message.

Then, if the user requests printing, the flow advances to step S1911, and the CPU 301 determines whether there is a printing right on the basis of the information received from the policy server 103. If there is a printing right, the flow advances to step S1912, and the CPU 301 executes printing of the document. For example, the CPU 301 transmits print job data to the multi-function copier 102 via the communication I/F 305. If there is no printing right, the flow advances to step S1913, and the CPU 301 displays an error message.

[Other Embodiments]

In the above embodiment, an access policy is given when scanned image data read by the reader 211 of the multi-function copier 102 is to be transmitted. However, it is of course also possible to similarly give an access policy to a document file saved in the hard disk drive 203 of the multi-function copier 102.

The various embodiments have been described in detail above, but the present invention is applicable to a system comprising a plurality of devices, or an apparatus comprising a single device. Examples are a scanner, printer, PC, copying machine, multi-function copier, and facsimile apparatus.

The present invention can also be provided by supplying a software program for implementing the functions of the above-mentioned embodiments to a system or apparatus directly or from a remote place, and allowing a computer included in the system or apparatus to read out and execute the supplied program code.

Accordingly, the program code itself installed in a computer to implement the functions and processing of the present invention by the computer also implements the present invention. That is, the present invention includes the computer program itself for implementing the functions and processing described above.

In this case, the program can take any form as long as it has the function of a program. Examples are an object code, a program executed by an interpreter, and script data to be supplied to an OS.

Examples of a recording medium for supplying the program are a flexible disk, hard disk, optical disk, magnetooptical disk, MO, CD-ROM, CD-R, and CD-RW. The recording medium may also be a magnetic tape, nonvolatile memory card, ROM, or DVD (DVD-ROM or DVD-R).

The program may also be downloaded from a homepage of the Internet by using the browser of the client computer. That is, the computer program itself of the present invention or a compressed file containing an automatic installation function can be downloaded from the homepage to a recording medium such as a hard disk. It is also possible to divide the program code forming the program of the present invention into a plurality of files, and to download the individual files from different homepages. That is, a WWW server which allows a plurality of users to download a program file for implementing the functional processing of the present invention by a computer may also be the constituent element of the present invention.

Furthermore, the program of the present invention may also be encrypted and distributed to users by storing the program in a storage medium such as a CD-ROM. In this case, only a user who has cleared predetermined conditions is allowed to download key information for decryption from a homepage across the Internet, and decrypt and execute the encrypted program by using the key information, thereby installing the program in the computer.

The functions of the above embodiments may also be implemented by executing the readout program by the computer. Note that an OS or the like running on the computer may also perform part or the whole of actual processing on the basis of instructions by the program. The functions of the above embodiments can of course be implemented in this case as well.

Furthermore, the program read out from the recording medium may also be written in a memory of a function expansion board inserted into the computer or of a function expansion unit connected to the computer. A CPU or the like of the function expansion board or function expansion unit may also perform part or the whole of actual processing on the basis of instructions by the program. The functions of the above embodiments are sometimes implemented in this way.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-236735, filed Aug. 17, 2005, which is hereby incorporated by reference herein in its entirety.

What is claimed is:

1. An image processing apparatus connectable to a policy server which transmits access policy definition information registered in association with a file when receiving an inquiry about an access policy of the file, the image processing apparatus comprising:
a storage unit which stores files;
a determining unit which determines whether an access policy has been given to one of the files which is to be transmitted;
a registering unit which forms definition information for defining an access policy and registering the formed definition information in said policy server connected to said image processing apparatus, in order to give the access policy defined by the formed definition information to the file which is to be transmitted if the determining unit determines that an access policy is not given to the file which is to be transmitted, wherein the definition information indicating that a sender of the file to be transmitted has access right to the file;
a transmitting unit which transmits, across a network, the file to which the access policy is given; and
a manual setting unit which allows an operator to manually set information associated with the access policy and necessary to form the definition information,
wherein, if the operator sets no information concerning the access policy via said manual setting unit, then said determining unit determines that the access policy is not given, and
wherein said registering unit comprises:
a comparing unit which compares identification data of a sender of the file to be transmitted and identification data of a receiver of the file, if no access policy is given to the file; and
a forming unit which forms a definition file indicating that only the sender has an access right to the file, if the identification data of the sender and the identification data of the receiver match.

2. An image processing apparatus as claimed in claim 1, wherein if a receiver of the file is a preregistered user, said registering unit forms definition information indicating that the receiver also has the access right to the file in addition to the sender.

3. An image processing apparatus as claimed in claim 1, further comprising an input unit which inputs information necessary to form definition information of an access policy to be given to the file to be transmitted, if the sender and the receiver do not match,
wherein said forming unit forms the definition information on the basis of the input information.

4. An image processing apparatus connectable to a policy server which transmits access policy definition information registered in association with a file when receiving an inquiry about an access policy of the file, the image processing apparatus comprising:
a storage unit which stores files;
a determining unit which determines whether an access policy has been given to one of the files which is to be transmitted;
a registering unit which forms definition information for defining an access policy and registering the formed definition information in said policy server connected to said image processing apparatus, in order to give the access policy defined by the formed definition information to the file which is to be transmitted if the determining unit determines that an access policy is not given to the file which is to be transmitted, wherein the definition information indicating that a sender of the file to be transmitted has access right to the file;
a transmitting unit which transmits, across a network, the file to which the access policy is given; and
a manual setting unit which allows an operator to manually set information associated with the access policy and necessary to form the definition information,
wherein, if the operator sets no information concerning the access policy via said manual setting unit, then said determining unit determines that the access policy is not given, and
wherein said registering unit comprises:
a comparing unit which compares identification data of a sender of the file to be transmitted and identification data of a receiver of the file, if no access policy is given to the file; and
a designating unit which designates, from existing definition information, definition information of an access policy to be given to the file to be transmitted, if the sender and the receiver do not match.

* * * * *